INVENTOR.
RAYMOND EARL BABB
BY
Allen and Chromy
ATTORNEYS

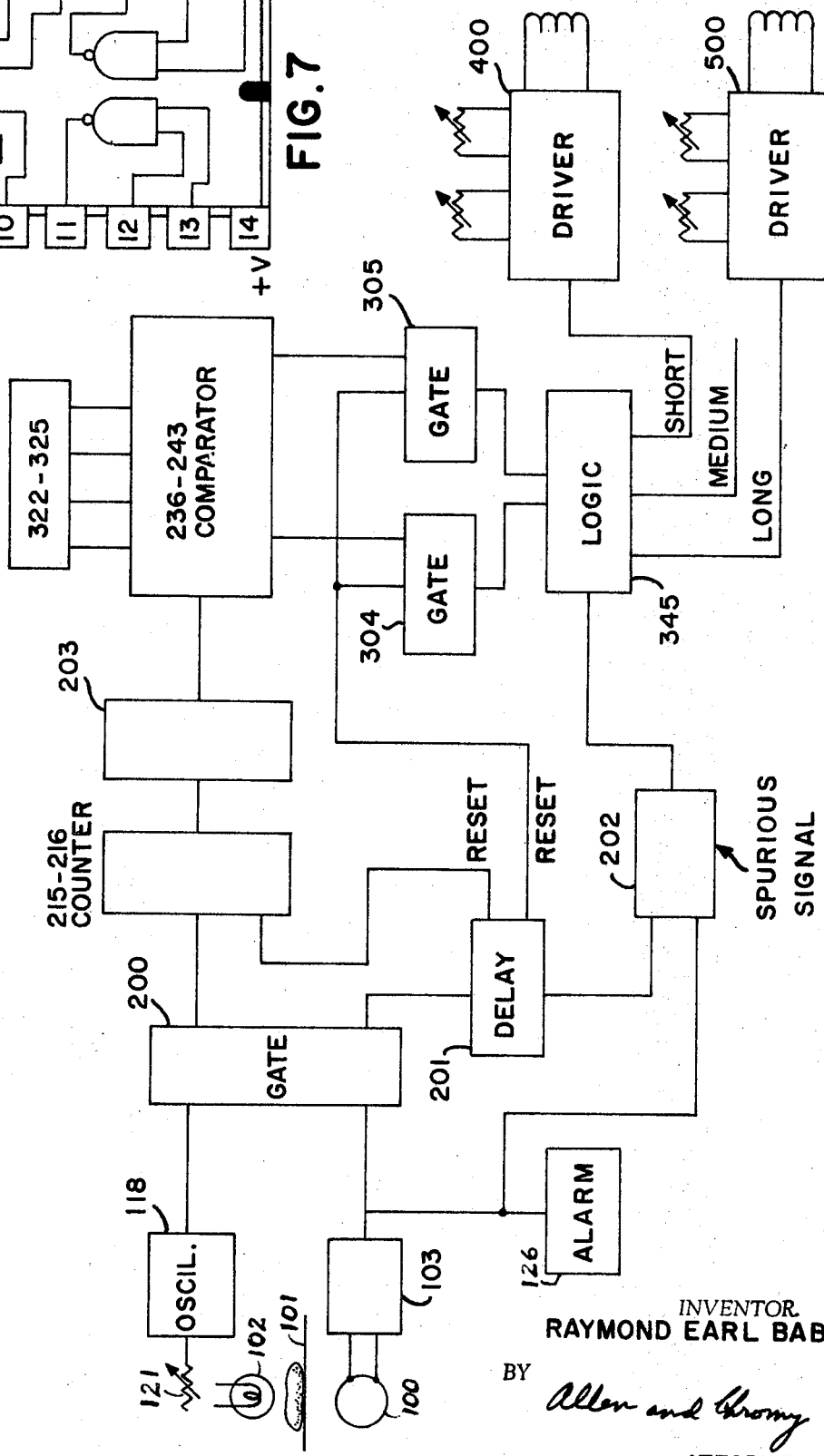

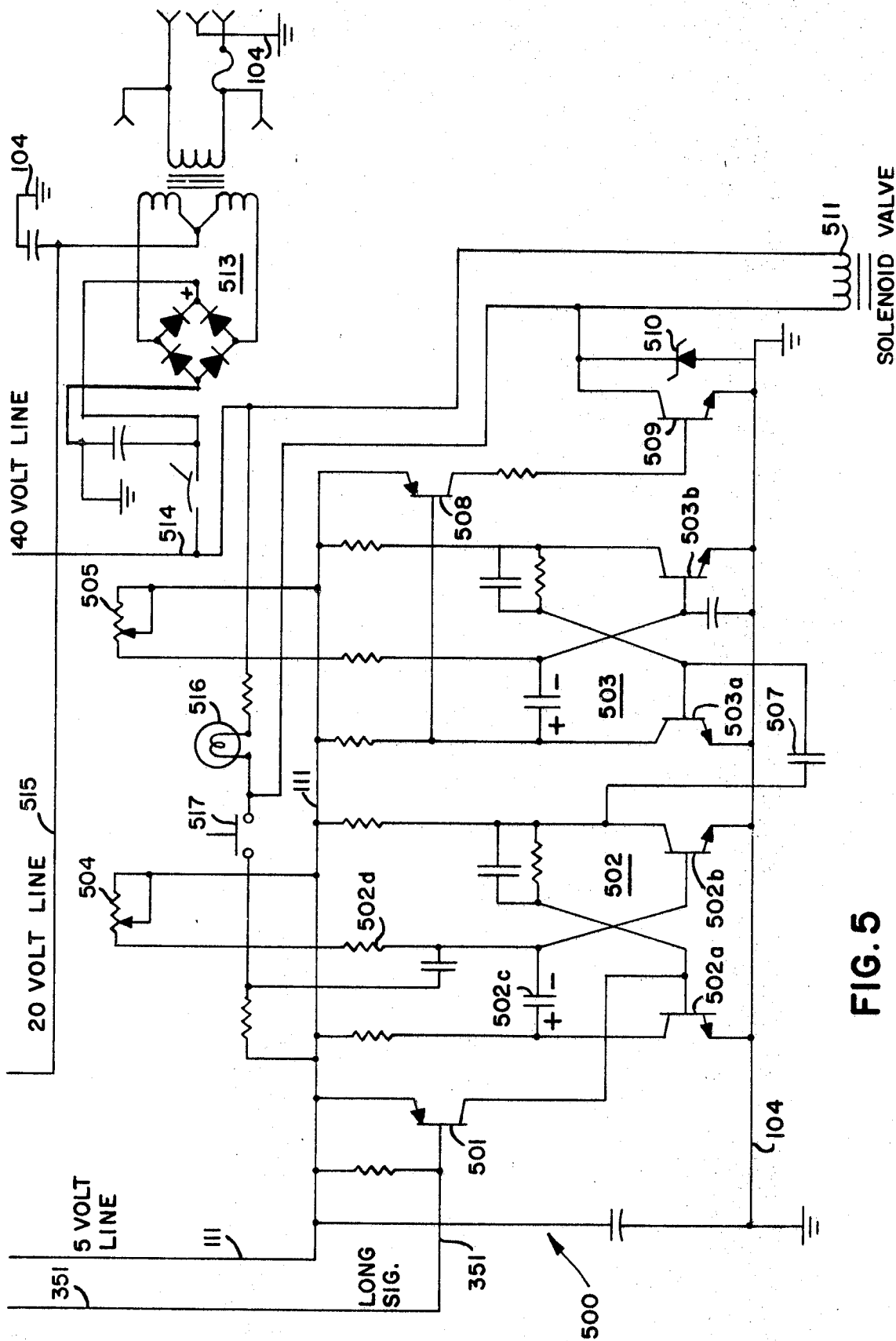

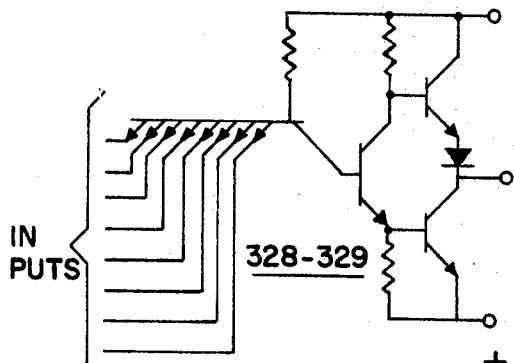
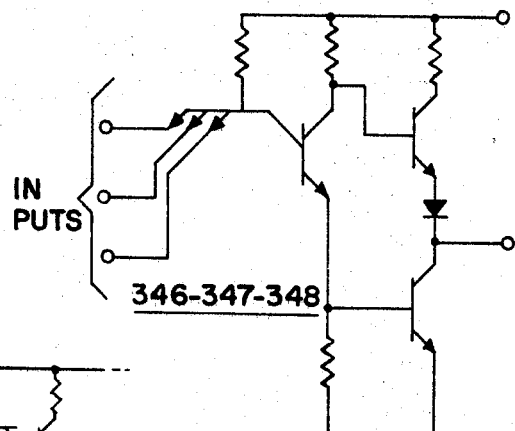
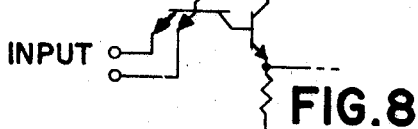
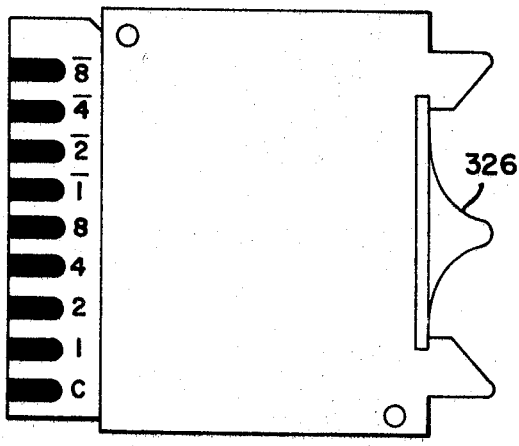
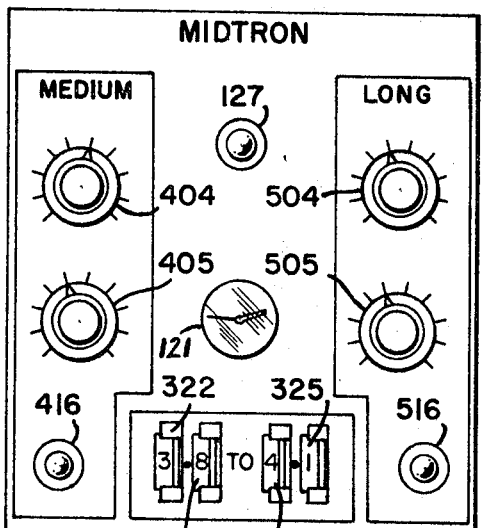
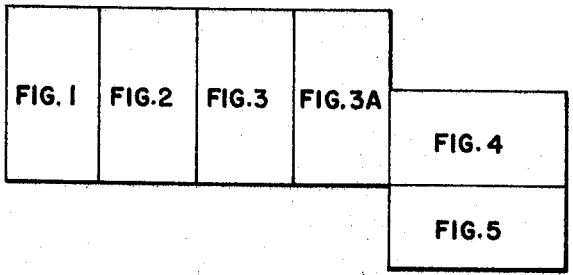
INVENTOR
RAYMOND EARL BABB

3,525,433
APPARATUS FOR SORTING PRODUCTS
Raymond Earl Babb, Fremont, Calif., assignor of one-half to Genevieve I. Hanscom (formerly Genevieve I. Magnuson), and one-half to Genevieve I. Hanscom, Robert Magnuson, and Lois J. Thomson (formerly Lois J. Duggan), as trustees of the estate of Roy M. Magnuson
Filed Aug. 12, 1968, Ser. No. 751,815
Int. Cl. B07c 1/14
U.S. Cl. 209—82                                   11 Claims

ABSTRACT OF THE DISCLOSURE

A product length sorter employing a circuit supplying electric pulses to decade counters while a product is being scanned. The output of the counters is supplied to a comparator network where it is compared with the settings of thumb wheel switches to determine if the counter registers a lower or a higher count than that set into said thumb wheel switches. Appropriate flip-flops connected to this network control selected gates in the apparatus logic in accordance with the length of the product scanned so that the output corresponding to such length is energized when the strobe pulse, which passes through a spurious signal rejector, is supplied to the apparatus logic. Command signals from the logic are transmitted to solenoid driver circuits for controlling the timing and direction of energization of selected solenoids which control air jets used to deflect the products according to the lengths thereof.

---

This invention relates to apparatus for sorting products such as cucumbers or the like, according to their lengths.

An object of this invention is to provide an improved apparatus for sorting products according to the lengths theerof, said apparatus employing a multiplicity of integrated circuit units, thereby enabling this apparatus to be made in a compact, efficient and economical manner, said apparatus also being very reliable in operation.

Another object of this invention is to provide an improved apparatus for sorting products that is not only efficient in operation but is constructed using solid state integrated circuits, said apparatus also being provided with pulse counting means connected to a comparator network in which the length characterized signals from the counting means are compared with settings of thumb wheel switches which are manually set to the desired product lengths to be sorted, said comparator network providing outputs to the system logic which supplies command signals to driver circuits controlling the product separator units of the apparatus.

Another object of this invention is to provide an improved apparatus for sorting products according to the lengths thereof, said apparatus being provided with a spurious signal rejector which rejects the signals unless they are within a predetermined timing range so that the product deflecting apparatus connected to the output is not operated erratically and unnecessarily by these signals.

Another object of this invention is to provide a product length sorter employing an arrangement for supplying electric pulses to two decade counters while a product is being scanned, the output of said counters being supplied to a comparator circuit where it is compared with the settings of thumb wheel switches to determine if the counter registers a lower or a higher count than that set into said thumb wheel switches so that an appropriate flip-flop may be set to control selected gates in the system logic in accordance with the length of the product scanned so that a command signal corresponding to such length is supplied thereby when a delayed strobe pulse is transmitted thereto.

Other and further objects of this invention will be apparent to those skilled in the art to which it relates from the following specification, claims and drawing.

In accordance with this invention there is provided an apparatus for sorting products according to their lengths which is an improvement over the apparatus disclosed in Simmons application Ser. No. 621,981, now Pat No. 3,455,444 assigned to a common assignee. The product to be sorted is moved single file at a predetermined speed by a conveyor through a scanning zone which employs a light source and a light-sensitive cell for generating an electric control pulse while the product is being moved through the scanning zone. This pulse is used to control the supplying of clock pulses from an oscillator to decade counters which count the pulses while the product is in the scanning zone so that the number of pulses counted is a measure of the product length. These decade counters provide binary coded output to a comparator network. The control pulse is also supplied to one-shot multivibrators which are connected in cascade, the first of which produces a pulse delayed by ten microseconds, which is referred to as the strobe pulse. The second of these one-shot multivibrators delays the signal by an additional ten microseconds, thereby providing a 20 microsecond delayed signal for resetting the decade counters and for resetting the flip-flops which are connected between the comparator network and the logic. The 10 microsecond delayed signal is supplied to a spurious signal rejector circuit and, if it is not a spurious signal, then it is supplied to the logic gates. The outputs of the decade counters are supplied to the comparator network in which this output is compared with the settings of manually set thumb wheel switches. The result is supplied to two eight-input gates which are connected to control flip-flops of gates supplying an input to the system logic gates.

The system logic is provided with three outputs designated as the small, medium and long which correspond to the small, medium and long products being measured. Two of these outputs are connected to the driver circuits for controlling the solenoid operated air jet valves which control the air jets used to deflect the products of the selected lengths. Thus, if the short and long products are to be deflected and the medium products allowed to proceed from the conveyor normally without deflection, then the short and long outputs are connected to the driver circuits. On the other hand, if the medium and long products are to be deflected, then the medium and long outputs are connected to the solenoid driver circuits. Two driver circuits are employed and each is provided with a pair of one shot multivibrators connected in cascade. Each of the flip-flops is provided with a variable resistor to control the timing thereof. The first one shot multivibrator in each cascade controls the delay between the setting of this one shot multivibrator by the signal from the logic to a time when the second one shot multivibrator in the cascade is reset. This time interval corresponds to the length of time that it takes a product to move from the scanning zone to the air jet deflecting zone so that the particular product being scanned is the one that is subjected to the air jet and deflected, if necessary, in accordance with the signal obtained from the logic. The second cascade is provided with a variable resistor which controls the duration that this second one shot multivibrator controls the energization of the air jet solenoid.

Further details of this invention will be set forth in the following specification, claims and drawing in which, briefly:

FIG. 1A is a block diagram of an embodiment of this apparatus;

FIGS. 1, 2, 3, 3A, 4 and 5 illustrate a schematic wiring diagram of an embodiment of this apparatus when these figures are assembled in accordance with the chart shown in FIG. 6;

FIG. 7 is a view showing the terminal arrangement of NAND gate unit 200 shown in FIG. 2;

FIG. 8 is a wiring diagram of each of the gates employed in NAND gate unit 200;

FIG. 9 is a side view of one of the thumb wheel switches showing the binary coded terminals thereof;

FIG. 10 is a chart of the binary code of one of the thumb wheel switches;

FIG. 11 is a schematic wiring diagram of one of the gates employed in the logic unit;

FIG. 11A is a schematic diagram of an eight-input gate; and

FIG. 12 is a front view of the control panel of this apparatus.

Figure 1:
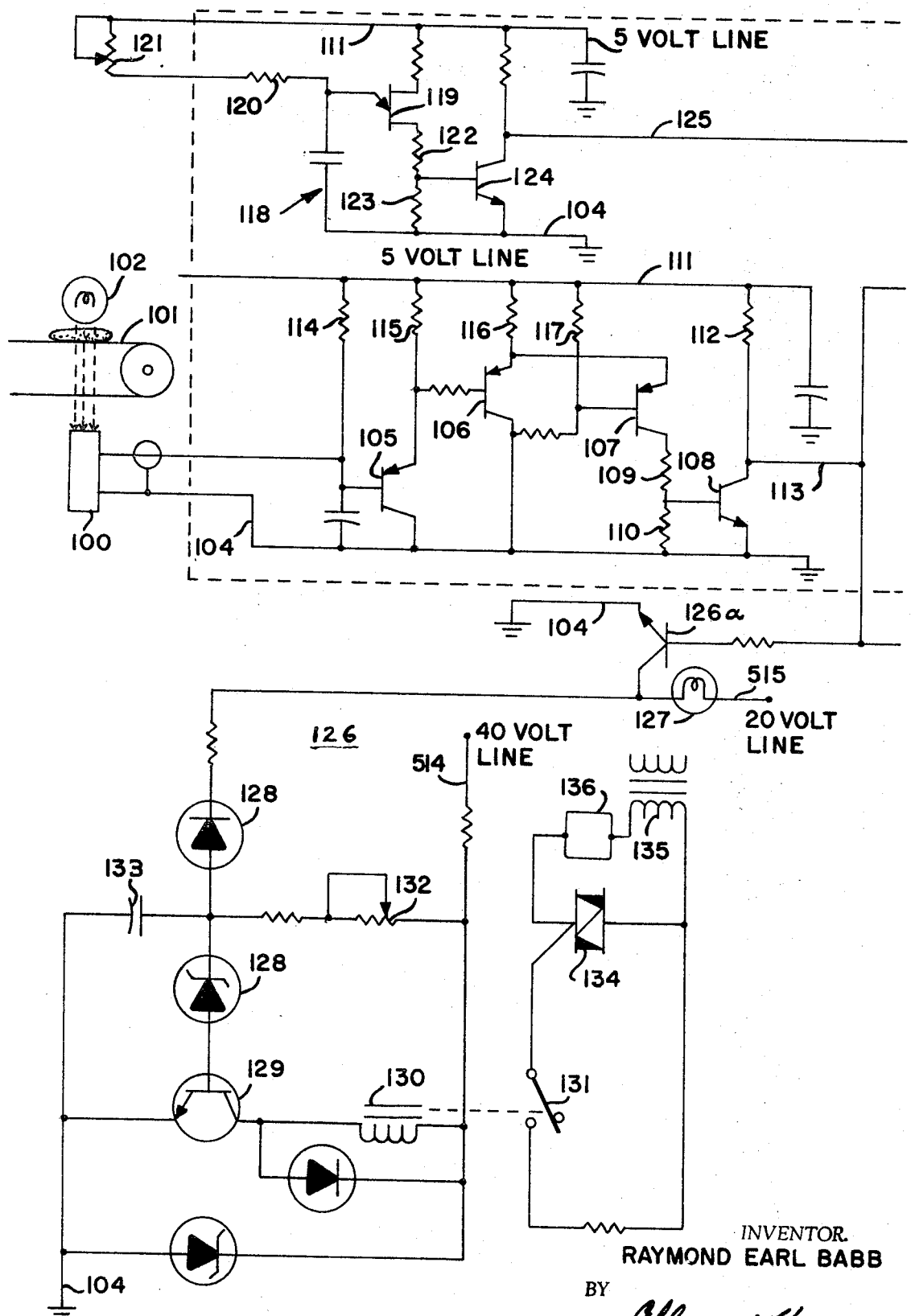

Referring to the block diagram FIG. 1A, reference numeral 100 designates a light-sensitive photodiode that is positioned in relation to the single file product conveyor 101 so that light from the light source 102 is interrupted by the product as the product is moved by the conveyor. This part of this apparatus is similar to the corresponding part of the apparatus disclosed in application Ser. No. 621,981, filed by Patrick M. L. Simmons on Mar. 9, 1967, and assigned to a common assignee.

The photodiode 100 is connected by a shielded line to the input of the amplifier and Schmitt trigger 103 which produces a square pulse on its output while the product is on the conveyor 100 and interrupts the light passing from the light source 102 to the photodiode 100. The square pulse from the amplifier and Schmitt trigger 103 comprises one of the inputs to the gate 200. Another input to this gate is provided by the oscillator 118 which generates pulses of a predetermined frequency that is adjustable by the variable resistor 121 and which frequency is correlated with the speed of the conveyor 101.

The square pulse from the amplifier and Schmitt trigger 103 is also supplied to the multivibrator 202 and to the alarm 126. Pulses from the gate 200 are supplied to the decade counters 215–216 over line 214 and to the differentiating circuit which is connected to the multivibrators 201. Multivibrator 201 supplies a twenty microsecond delayed reset signal to the counters 215–216 over line 233 and a twenty microsecond delayed reset signal to the flip-flops in gates 304–305 over line 234, and also a ten microsecond delayed signal to the spurious signal rejector 202 over line 235. The spurious signal rejector 202 supplies the stroke signal to the separator logic 345 over line 236.

The binary coded decimal output of decade counters 215–216 is supplied to the comparator network 300 which is connected to the gates 328 and 329. Thumb wheel switches 322–323 and 324–325 are connected to the comparator network 300 to select the product length ranges to be classified into the short, medium and long length products. The outputs of the gates 328 and 329 are connected to the flip-flops in gates 304 and 305, respectively, and the outputs of these gates are connected to the three gates of the system logic 345 in which they, together with the strobe signal, determine which output line is to conduct the command signal to the appropriate solenoid driver unit. Solenoid driver unit 400 receives the command signal for either the short or medium length product, depending on which logic output line is connected thereto, and driver 500 receives the command signal for the long length product.

Driver 400 is provided with two one shot multivibrator circuits connected in cascade. The time delay of the first multivibrator is controlled by the variable resistor 404 and the time duration of the second multivibrator is controlled by the variable resistor 405. The first multivibrator is timed so that the solenoid 411 is energized after a time delay corresponding to the length of time required for the product to travel from the scanning zone to the deflection zone at which the air jet that is controlled by the solenoid 411 is positioned, and the variable resistor 405 controls the multivibrator connected thereto for timing the duration of the energization of the solenoid 411 so that this solenoid opens the air valve controlled thereby for a sufficient length of time to deflect the product. Similarly, the solenoid driver 500 is provided with a pair of one shot multivibrators connected in cascade, and the first of these multivibrators is controlled by the variable resistor 504 which is adjusted so that the associated multivibrator causes the energization of the solenoid 511 to be delayed a sufficient length of time to give the product time to be moved from the scanning zone to the deflecting zone controlled by this solenoid. Variable resistor 505 is connected to the second multivibrator in driver 500 and controls the duration of the energization of solenoid 511.

Figure 2:
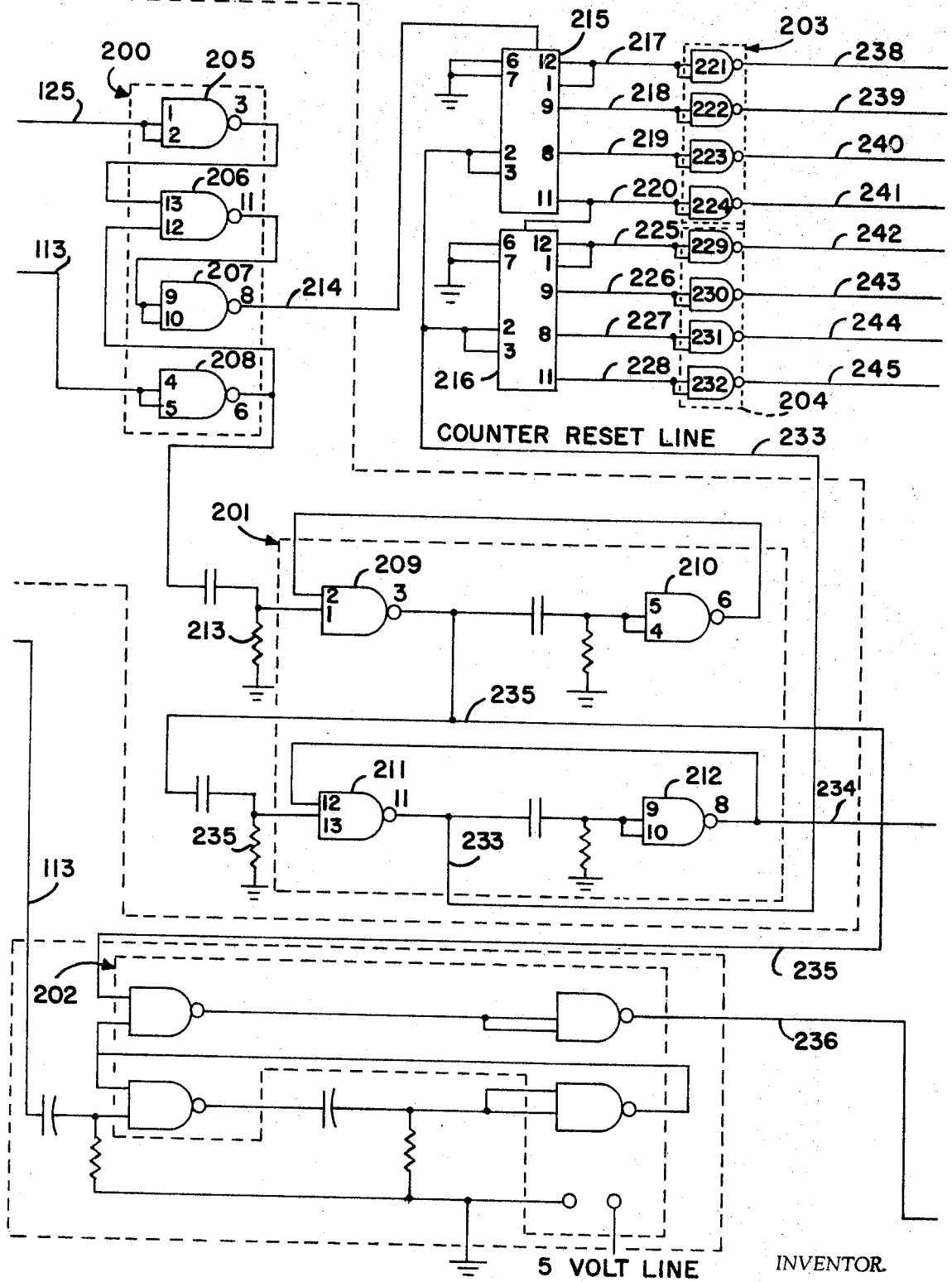
Figure 3:
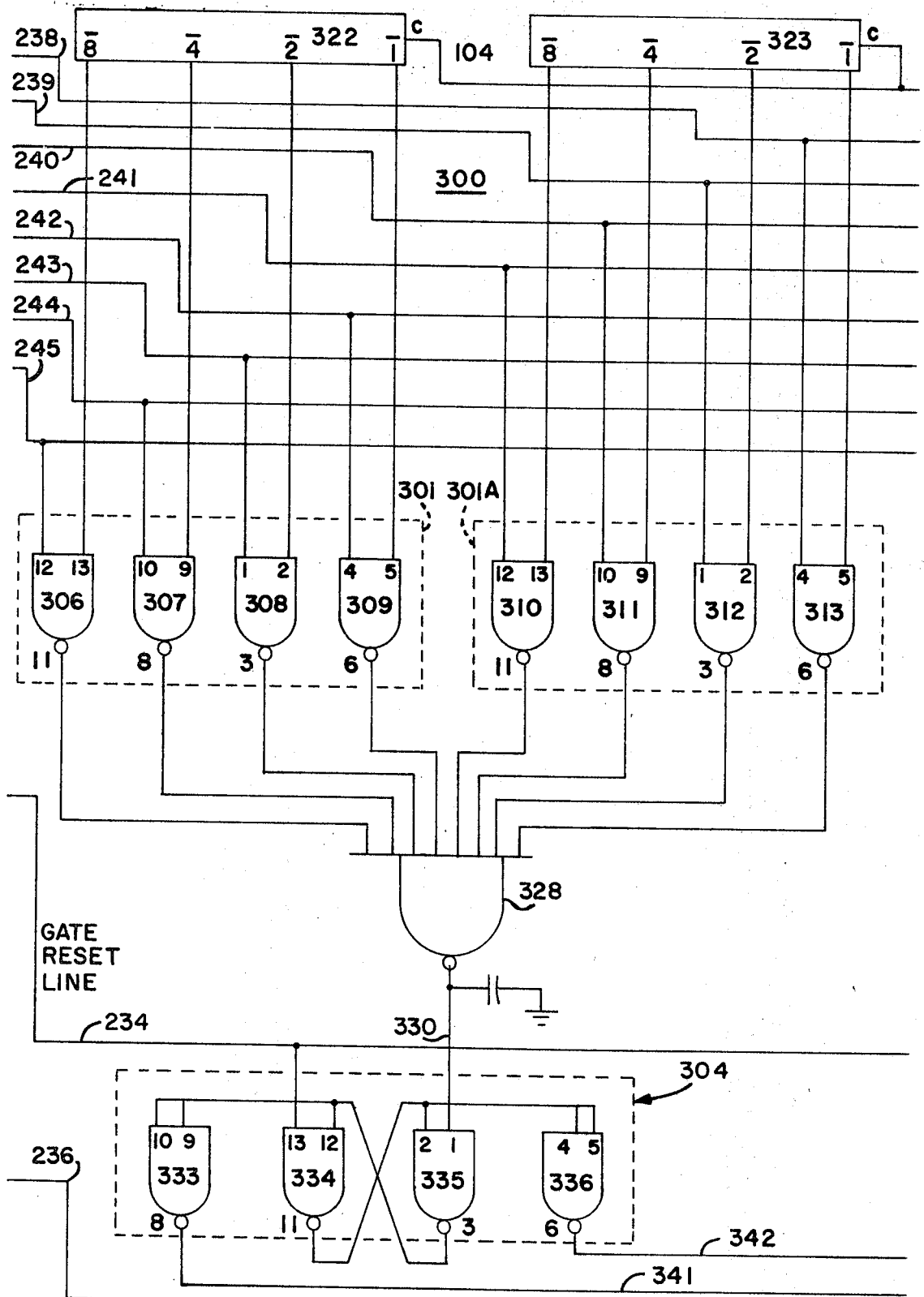
Figure 3A:
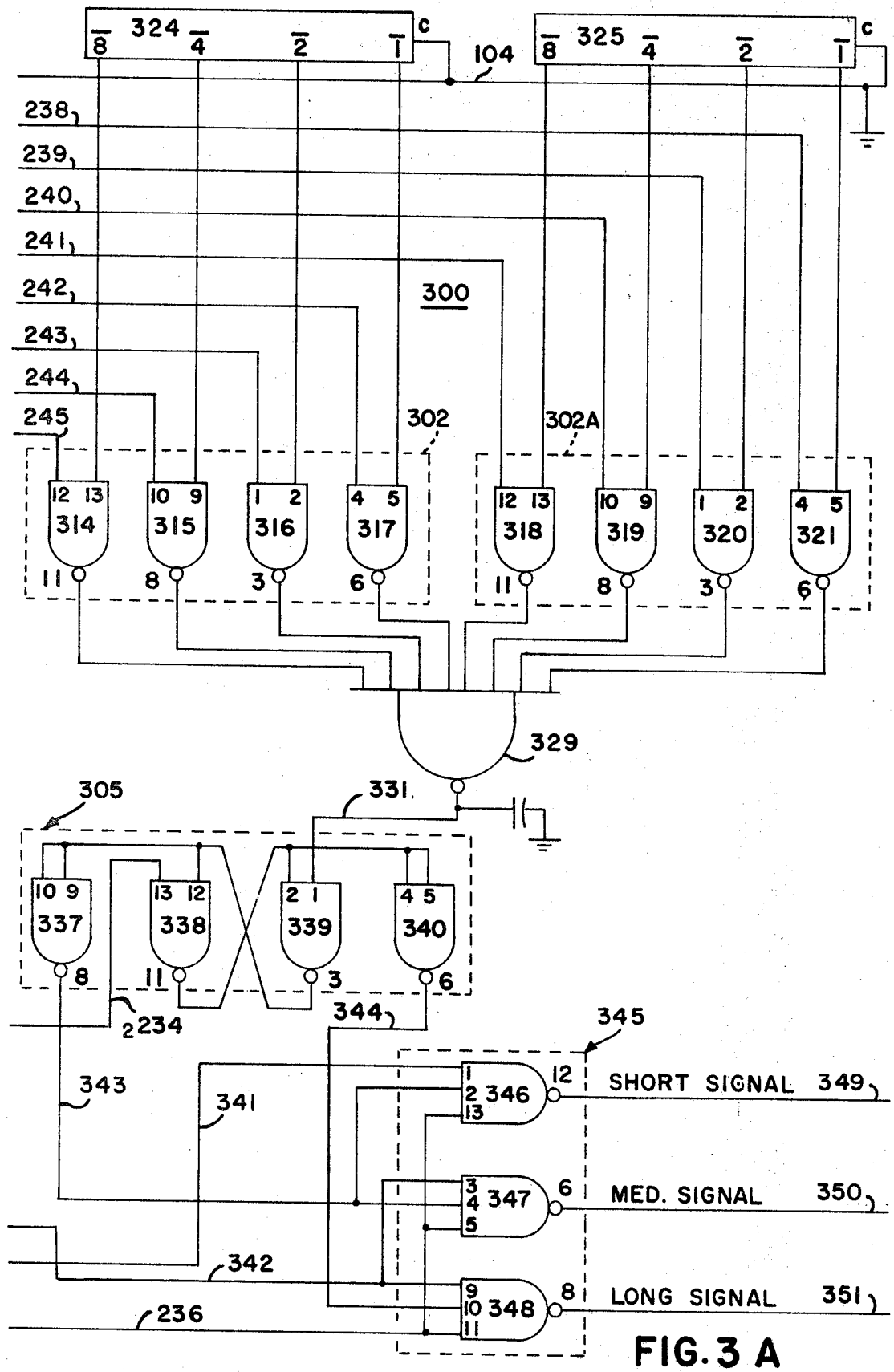
Figure 4:
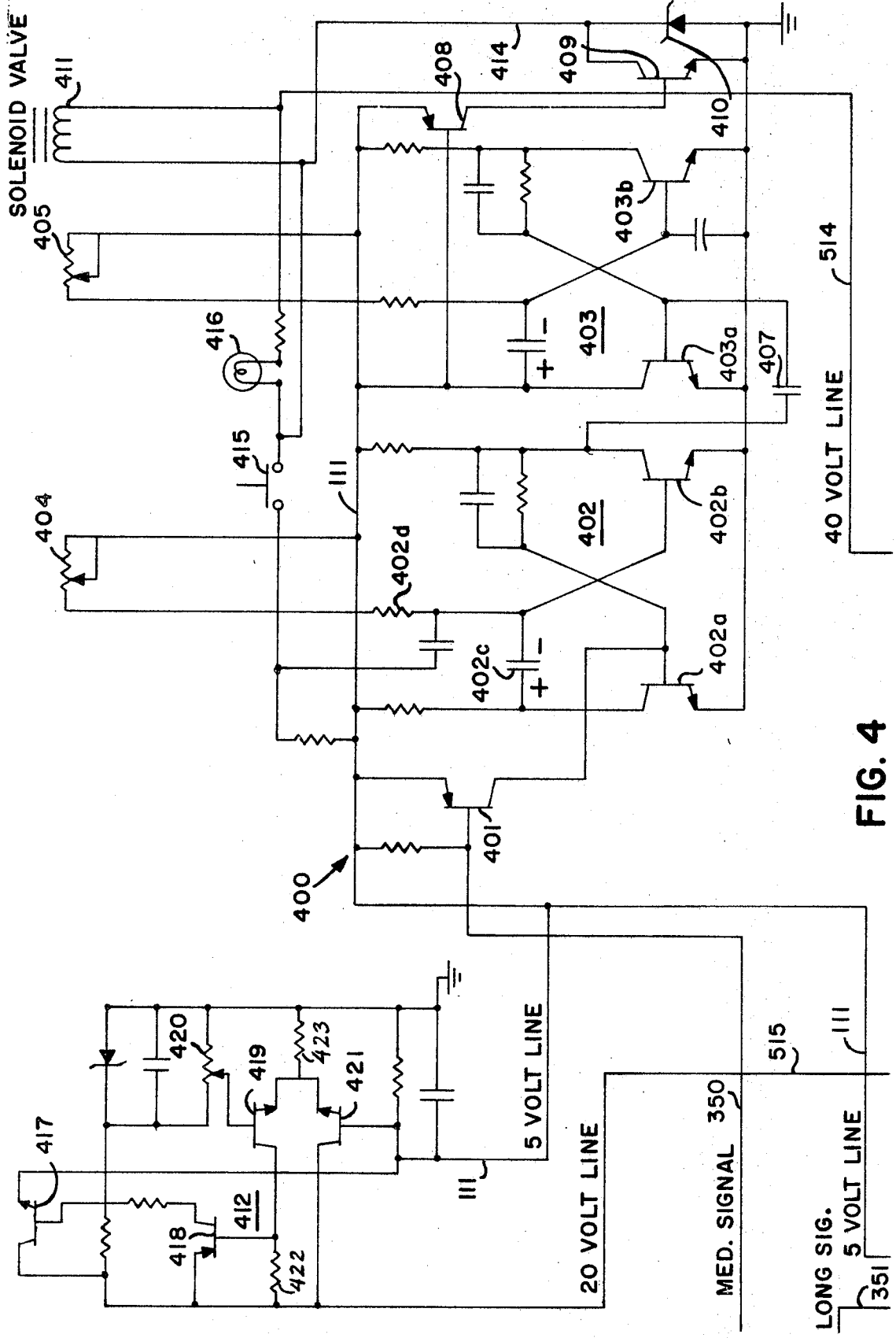

Referring now to the schematic wiring diagram, FIGS. 1, 2, 3, 3A, 4 and 5, it will be noted that the parts shown in FIG. 1 are designated by reference numerals starting with 100; the parts shown in FIG. 2 are designated by reference numerals starting with 200; the parts shown in FIGS. 3 and 3A are designated by reference numerals starting with 300; the parts shown in FIG. 4 are designated by reference numerals starting with 400, and the parts shown in FIG. 5 are designated by reference numerals starting with 500. It will be noted, however, that lines extending from one figure to the next are in each case identified by the same reference numerals.

The photodiode 100 is connected by a shielded line to the base of transistor 105 of amplifier and trigger unit 103. The shield of this line is connected to the ground line 104 which is also connected to the photodiode and to the collector of transistor 105. The emitter of transistor 105 supplies the input to the Schmitt trigger which employs transistors 106 and 107 in a conventional circuit. The output of the Schmitt trigger circuit is connected to the series resistors 109 and 110 and the common point between these resistors is connected to the base of transistor 108. The emitter of transistor 108 is connected to the ground line 104 and the collector is connected to the positive 5 volt supply line 111 through resistor 112. The collector is also connected to the output line 113. The positive 5 volt line 111 is also connected to the upper terminals of resistors 114, 115, 116 and 117. The lower terminals of resistors 114 and 115 are connected to the base and emitter, respectively, of transistor 105, and the lower terminals of resistors 116 and 117 are connected to the emitter and base of transistors 106 and 107, respectively. Feedback is provided from emitte of transistor 107 to emitter of transistor 106.

The output line 113 is connected to terminals 4 and 5 of the NAND gate unit 200. The gate unit 200 is a quadruple two-input positive NAND gate of the type SN7400N manufactured by Texas Instruments, Incorporated of Dallas, Tex. This unit is an integrated circuit provided with four gates and each unit has 14 terminals numbered as shown in FIG. 7. Each gate in the unit is connected in accordance with the schematic diagram shown in FIG. 8. This apparatus employs eleven of these quadruple two-input positive NAND gate units which are identified by reference numerals 200, 201, 202, 203 and 204, shown in FIG. 2, and reference numerals 301, 301A, 302, 302A, 304 and 305, shown in FIG. 3. While the internal makeup of these quadruple NAND gates is the same, the external connections thereto are different, as will be described hereinafter. Also, terminal 7 (not shown) of each of these gates is connected to ground line 104, and terminal 14 (not shown) is connected to the positive 5 volt regulated supply line 111 leading to the regulator 412 shown in FIG. 4.

The relaxation oscillator 118 is provided with a unijunction transistor 119, and the emitter electrode of this transistor is connected to the positive 5 volt line 111 through resistor 120 and through variable resistor 121. The variable resistor 121 is provided for the purpose of adjusting the frequency of the relaxation oscillator 118 to correlate this frequency with the speed of the product transporting belt 101. Series connected resistors 122 and 123 are provided between the transistor 119 and the ground line 104 and the common connection between these resistors is connected to the base of transistor 124, the collector of which is connected to the output line 125 which leads to the terminals 1 and 2 of gate 205 of integrated circuit unit 200. Gate 205 is employed as a signal inverter and the output terminal 3 thereof is connected to the input terminal 13 of the NAND gate 206. The output line from the Schmitt trigger 113 is connected to terminals 4 and 5 of gate 208, which is also connected as a signal inverter, and the output terminal 6 of this gate is connected to the input terminal 12 of gate 206 and also to the input terminal 1 of gate 209 of the integrated circuit unit 201 through the capacitor of the differentiating circuit 213. The output terminal 11 of the NAND gate 206 is connected to the input terminals 9 and 10 of the signal inverter 207. The output terminal 8 of the inverter 207 is connected to the line 214 which supplies input pulses to the decade counter unit 215. Decade counters 215 and 216 provide binary coded decimal output. Counters 215 and 216 are sold by Texas Instruments, Incorporated under the type number SN7490N integrated circuits. Output terminals 1 and 12 of counter 215 are connected together to line 217 and output terminals 9, 8 and 11 are connected to lines 218, 219 and 220, respectively. These lines are connected to the inputs of gates 221, 222, 223 and 224 of the integrated circuit unit 203 which function as signal inverters. Line 220 also functions as the input line to the next order counter 216 which is similar to decade counter 215. Terminals 1 and 12 of counter 215 are connected together to line 225 which leads to gate 229 of integrated circuit unit 204. Terminals 9, 8 and 11 of decade counter 216 are connected to lines 226, 227 and 228, respectively, which leads to gates 230, 231 and 232, respectively, which function together with gate 229 as signal inverters. Both decade counters 215 and 216 have the terminals 6 and 7 thereof connected to ground and terminals 2 and 3 thereof are connected to the counter reset line 233. The delayed reset signal is supplied to decade counters 215 and 216 over line 233 from the integrated circuit unit 201. Gates 209, 210, 211 and 212 of this unit function as signal delay means providing a ten microsecond delay to the signal supplied to line 234 and a 20 microsecond delay to the signal supplied to the counter reset line 233. The inverted pulse from the Schmitt circuit is supplied to the differentiating circuit 213 which is connected to input terminal 1 of gate 209. Feedback is provided from output terminal 6 of gate 210 to input terminal 2 of gate 209. The output terminal 3 of gate 209 is connected to line 234 and is also coupled by a timing capacitor to input terminals 4–5 of gate 210. The signal supplied to line 234 is delayed ten microseconds and this signal is supplied to the differentiating circuit 235 which is connected to input terminal 13 of gate 211. The output of gate 212 is supplied to input terminal 12 of gate 211 and the output from terminal 11 of gate 211 is supplied to the counter reset lines 233 and to input terminals 9–10 of gate 212 through a timing capacitor. The output signal supplied to line 233 is delayed an additional 10 microseconds or a total of 20 microseconds.

The pulses supplied to lines 217, 218, 219 and 220 by the decade counter 215 are inverted by the gates 221, 222, 223 and 224, respectively, and the pulses supplied by decade counter 216 to lines 225, 226, 227 and 228 are inverted by the gates 229, 230, 231 and 232, respectively. The outputs of gates 221, 222, 223 and 224 are supplied to lines 238, 239, 240 and 241, respectively, of the comparator network 300 shown in FIGS. 3 and 3A, and the outputs of gates 229, 230, 231 and 232 are supplied to lines 242, 243, 244 and 245, respectively, of this network. Lines 238 to 245 inclusive carry signals to an input terminal of each of the NAND gates in integrated circuit units 301, 301A, 302 and 302A. Thus, line 238 is connected to terminals 4 of NAND gates 313 and 321; line 239 is connected to terminals 1 of NAND gates 312 and 320; line 240 is connected to terminals 10 of NAND gates 311 and 319; and line 241 is connected to terminals 12 of NAND gates 310 and 318. These NAND gates are thus supplied with signals from lines 238 to 241 inclusive which may be designated as the tenths lines since they are supplied with signals from the first decade counter 215. Lines 242 to 245 inclusive may be designated as the units lines since they are supplied with signals from the decade counter 216, and these lines are connected to the NAND gates of units 300 and 302. Thus, line 242 is connected to terminals 4 of NAND gates 309 and 317; line 243 is connected to terminals 1 of NAND gates 308 and 316; line 244 is connected to terminals 10 of NAND gates 307 and 315; and line 245 is connected to terminals 12 of NAND gates 306 and 314.

The other input terminals of AND gates 306 to 321 inclusive are connected to the thumb wheel switches 322, 323, 324 and 325. These switches are of the binary coded decimal complement output type 310 manufactured by the Digitran Company of Pasadena, Calif. A side view of one of these switches is shown in FIG. 9 which also shows the binary coding of the terminals provided thereto, and FIG. 10 illustrates the binary code of the complement for each of the ten positions of the switch dial 326. The C terminal of each of the switches 322 to 325 inclusive is connected to the ground line 104. The $\overline{8}$-$\overline{4}$-$\overline{2}$-$\overline{1}$ terminals of switches 322, 323, 324, and 325 are connected to terminals 13, 9, 2 and 5, respectively, of gates of the integrated circuit units 301, 301A, 302 and 302A, respectively.

The output terminals of units 301 and 301A are connected to the eight-input gate 328 which is a NAND gate type 7430 manufactured by Texas Instruments. NAND gate 329 is of the same type and the eight outputs of units 302 and 302A are connected to the eight inputs of this gate. Gates 328 and 329 are NAND gates and they provide zero signal level output to the output lines 330 and 331, respectively, when input signals are supplied to all eight inputs of each of these gates.

Integrated circuit units 304 and 305 are each provided with four gates. Unit 304 is provided with gates 333 and 336 which function as signal inverters, and gates 334 and 335 which are connected as a flip-flop. Likewise, unit 305 is provided with gates 337 and 340 which are to function as signal inverters and gates 338 and 339 are connected as a flip-flop. System reset signals are provided over line 332 from the output of gate 212 in unit 201 and this reset signal is the complement of the counter reset signal supplied over line 233. Reset signal line 332 is connected to gates 334 and 338 to reset the flip-flops at the end of each product scan by the photodiode. The outputs of gates 328 and 329 are supplied over lines 330 and 331, respectively, to terminals 1 of gates 335 and 339, respectively, to set these flip-flops.

Each of the integrated circuit units 304 and 305 have two output lines connected thereto for supplying signals to the logic unit 345. Output lines 341 and 342 are connected to the output terminals of gates 333 and 336, respectively, of unit 304, and output lines 343 and 344 are connected to the output terminals of gates 337 and 340, respectively, of unit 305. Logic unit 345 is an integrated circuit of the type SN7410 manufactured by Texas Instruments, Inc. This unit is provided with three gates 346, 347 and 348, each having three inputs as shown in schematic diagram FIG. 11. Inputs 13, 5 and 11 of these gates are connected to the line 236 which supplies the ten microsecond delayed strobe signal thereto from unit 201 shown in FIG. 2. Line 341 is connected to input 1 of gate 346 and line 342 is connected to inputs 3 and 9 of gates 347 and 348, respectively. Line 343 is connected to inputs 2 and 4 of gates 346 and 347, respectively, and line 344 is connected to input 10 of gate 348.

Output 12 of gate 346 is connected to line 349 which is the short product signal line, and output 6 of gate 347 is connected to line 350 which is the medium size product line. The output 8 of gate 348 is connected to line 351 which is the long size product signal line. The medium signal line 350 is connected to the base of transistor 401 which forms the input for the driver unit 400 of solenoid 411 that controls the valve of the air supply employed for deflecting the medium length products into the channel provided for receiving such products. Where it is desired to deflect the short length products instead of medium length products, then line 349 is connected to the base of transistor 401 instead of line 350 so that the short length product signals are employed for driving the solenoid 411 which controls the air jet and which, in this case, would function to deflect the short length products to the short length channel. In such case, the medium length products would not be deflected by this apparatus but would pass directly from the conveyor onto the channel provided for the medium length products without deflecting same. The long length products are deflected by the air jet controlled by solenoid 511 shown in FIG. 5. The driver unit provided for driving this solenoid is provided with an input transistor 501 and the long signal line 351 is connected to the base of this transistor.

The medium length driver is provided with two one shot multivibrators 402 and 403 connected in cascade, the first of which functions to provide a certain predetermined delay to the driver signal before this signal fires transistors 408 and 409 which control the energization of the solenoid. Multivibrator 402 employs transistors 402a and 402b, and the driver signal is supplied by transistor 401 to the base of transistor 402a. Variable resistor 404 is provided between the positive five volt line 111 and the right hand terminal of capacitor 402c so that this resistor, together with resistor 402d, controls the charging of capacitor 402c which is of rather large capacity. When capacitor 402c is charged, transistor 402b is turned on and transistor 402a is turned off. When transistor 402b is turned on it supplies a pulse through capacitor 407 to the base of transistor 403a and this transistor is turned on. At the same time, the base of transistor 408 is turned on and this functions to turn transistor 409 on since the base thereof is connected to the collector of transistor 408. Transistor 409 is in series with the 40 volt return line 414 and, when this transistor is turned on, the solenoid 411 is energized through the 40 volt line 514 that is supplied by rectified DC from rectifier 513 shown in FIG. 5.

The function of variable resistor 404 is therefore used to control the air delay, that is, the delay in turning on the air jet by the solenoid 411. This delay is accomplished by retarding multivibrator 402 so that transistors 408 and 409 are not turned on until after the medium length product being processed has had an opportunity to travel from the scanning zone to the zone of the air jet controlled by the solenoid 411.

Variable resistor 405 is connected between the positive five volt line 111 and the base of transistor 403b of multivibrator 403. This variable resistor is employed to control the duration of the energization of solenoid 411. Variable resistor 405 controls the time interval required for transistor 403a of flip-flop 403 to be turned off, and transistor 403b to be turned on, so that the duration of energization of solenoid 411 may be controlled. A Zener diode 410 is connected across transistor 409 to provide a circuit condition whereby the solenoid 411 responds more faithfully to the voltage pulse supplied thereto. If normal protective devices were used without this Zener, the response of the solenoid tended to be sluggish at cutoff so that large spacing had to be provided between the products on conveyor 101 to prevent the air jet from overlapping from one product to another. Also, Zener 410 protects transistor 409 from excessive voltages developed when the magnetic field of solenoid 411 collapses.

A test light 416 and a manually operable testing switch 415 are also provided to this driver unit. Switch 415 is connected between the return line 414 and one side of the capacitor 402e, and the other side of capacitor 402e is connected to the base of transistor 402b. Thus, by closing the switch 415, a pulse is supplied to the base of transistor 402b which is turned on. A pulse is then supplied to the base of transistor 403a so that the transistors 408 and 409 are turned on and solenoid 411 is energized. In this manner the driver circuit 400 may be tested by closing switch 415. Driver circuit 500 is provided with a similar manually operated test switch 517 which, when closed, supplies a pulse to the base of transistor 502b through capacitor 502e, and transistors 503a, 508 and 509 are turned on. Solenoid 501 is then energized through transistor 509.

Driver unit 500 for the long length products solenoid 511 is similar to that provided for driving medium length solenoid 411 in that two multivibrators 502 and 503 are provided for retarding the driving signal used for energizing the solenoid 511 which controls the deflecting air jet employed to deflect the long length products into the desired channel for products of such lengths. Variable resistors 504 and 505 are provided for controlling the operation of flip-flops 502 and 503, respectively, in the same manner as resistors 404 and 405 control the multivibrators of driver 400. Thus, the long length signal is supplied to the base of transistor 500 and this transistor supplies a bias voltage to the base of transistor 502a and turns this transistor on. Transistor 503a is supplied with a pulse to the base thereof through capacitor 507, thereby turning on transistor 503a and, at the same time, transistors 508 and 509 are also turned on so that solenoid 511 is energized through transistor 509 which is connected in series therewith.

The various integrated circuits employed in this apparatus require a well regulated five volt supply for energizing the circuits thereof, and such a supply is provided by the regulator 412 shown in FIG. 4 which supplies the five volt line 111 with a constant voltage. The regulator 412 is connected to the 20 volt line 515 supplied by the rectifier 513 shown in FIG. 5. A transistor 417 is connected between the 20 volt line 515 and the five volt line 111, and this transistor is instrumental in reducing the voltage from 20 volts to five volts. The bias to the base of transistor 417 is controlled by transistor 418 and the bias to the base of transistor 418 is controlled by transistor 419 which is responsive to change in voltage on the 20 volt line 515 and which is connected in series with resistors 422 and 423. In addition, transistor 421, which is also connected in series with resistor 423, is responsive to incipient changes in the voltage of the five volt line 111 since its base is connected to this line. As a result, the voltage drop across resistor 423 is affected by the current drawn by both transistors 421 and 419. The bias applied to the base of transistor 418 is thus varied by the voltage variations on lines 515 and 111, and this transistor varies the bias on transistor 417 for the purpose of holding the voltage on line 111 substantially constant.

An alarm is provided to this apparatus to produce an indication or signal if the photodiode amplifier and Schmitt trigger fail to provide output signals on line 113, shown in FIG. 1. This line is connected to the base of transistor 126a, the emitter of which is connected to the ground line 104 and the collector of which is connected to one side of the operating light source 127, the other side of which is connected to the 20 volt line 515. The common connection between the collector of transistor 126 and the light source 127 is also connected to the cathode of diode 128. The anode of diode 128 is connected to the common connection between capacitor 133 and resistor 132 and to the cathode of Zener 128. The anode of Zener 128 is connected to the base of transistor 129. Transistor 129 and winding of relay 130 are connected in series between the 40 volt line 514 and the ground 104.

When transistor 126 is normally biased by the output signal supplied over line 113, the operating light 127 is energized and also a blocking bias is provided to the base of transistor 129 so that the winding of relay 130 is not energized. If the signals on line 113 fail, then transistor 126 is turned off and light 127 goes out. After a time determined by the setting of resistor 132 and size of capacitor 133, transistor 129 receives a bias on the base thereof sufficient to turn this transistor on so that the winding of relay 130 is energized and the contacts 131 thereof are closed, thereby applying a firing voltage to the gate electrode of control device 134 which, when fired, conducts the alternating current from transformer 135 to the alarm device 136. Device 136 may be a bell, buzzer, light or any other suitable device adapted to indicate failure of output from the photocell amplifier and Schmitt trigger circuit.

The operation of this apparatus is as follows: While the product being fed single file on conveyor 101 interrupts the light from the light source 102 to the photodiode 100, the transistor amplifier and Schmitt trigger supply a substantially square pulse to gate 200 over line 113. Pulse generator 118 supplies pulses at a constant predetermined rate correlated to the speed of conveyor 101, to gate 200 over line 125. Pulses generated by pulse generator 118 are gated in gate 200 and supplied to decade counters 215–216 to lines 238–245 of comparator network 300 in binary code through inverters 203 and 204 while gate 206 is supplied with a pulse from line 113. Thumb wheel switches 322, 323, 324 and 325, which are binary coded as shown in FIGS. 9 and 10, are connected to NAND gates 301, 301A, 302 and 302A of the comparator network. Switches 322 and 323 are designated "short units" and "short tenths," respectively, and switches 324 and 325 are designated "long units" and "long tenth," respectively. These switches are set to select the short and long product lengths to be separated. Lines 238–241 of the comparator network are connected to NAND gates 301A and 302A of this network and supply binary coded signals derived from counter 215, and lines 242–245 are connected to NAND gates 301 and 302. The eight outputs of gates 301 and 301A are connected to the eight-input NAND gate 329 and the eight outputs of gates 302 and 302A are connected to the eight-input NAND gate 330. Zero level output results on the outputs of gates 329 and 330 if input is supplied thereto on all eight lines therefor. At least one of the eight inputs of each gate must be low if output is to be provided thereby to set the flip-flops in either gate 304 or gate 305. The flip-flops in gates 304 and 305 supply two of the inputs in each of the three-input gates in logic unit 345. The other input to each gate of the logic unit 345 is supplied by line 236 which carries the strobe signal from the spurious signal rejector 202 which prevents any signal appearing on line 113 whose duration is less than 4 milliseconds from being supplied to the strobe signal line 236.

The spurious signal rejector 202 is supplied with two input signals. One input is supplied by line 113 from the one shot in unit 103 and the other is the 10 microsecond delayed signal supplied to line 235 by the first stage one shot of unit 201. Unit 201 includes two stages of one shot multivibrators connected in cascade. The first stage is triggered by the inverted signal from line 113 and provides the 10 microsecond delayed signal to line 235 leading to the spurious signal rejector 202 and the two outputs of the second stage provide 20 microsecond delayed reset signals to lines 233 and 234. Reset signal line 233 carries the reset signal to counters 215–216 and reset signal line 234 carries the reset signal to the flip-flops in gates 304 and 305.

Spurious signal rejector 202 includes a NAND gate having one input connected to line 235 and having the other input connected to the output of a one shot multivibrator which produces a pulse 4 milliseconds long and is triggered by the negative spike developed from the leading edge of the pulse supplied on line 113. If the strobe pulse supplied to the NAND gate over line 235 occurs during the 4 millisecond one shot pulse, then no output is supplied to the strobe signal line 236. Signal pulses less than 4 milliseconds long occurring on line 113 are considered spurious since they would ordinarily be developed by very short products of about one-half inch in length. This apparatus is adjusted so that signals corresponding to such short length products cannot get through the logic unit 345 because rejector 202 will not transmit a strobe signal corresponding thereto to the logic unit. Only pulses supplied to line 113 which are longer than the 4 millisecond pulse produced by the rejector one shot are gated through the rejector to provide a strobe pulse to the gates in the logic unit 345. Of course, the length of the pulse produced by the rejector one shot may be lengthened or shortened by adjusting the values of components thereof in known manner to increase or decrease the length of spurious pulses to be rejected.

The logic unit 345 supplies command signals on lines 349, 350 and 351 corresponding to short, medium and long length products. If the short line 349 is connected to driver unit 400, then the command signal provided to this line controls the energization of solenoid 411 after a delay determined by the setting of resistor 404. Solenoid 411 controls an air valve that controls an air jet which, when turned on, will deflect the product corresponding to the command signal. Resistor 405 controls the duration that the solenoid 411 turns the air jet on so that this duration is long enough for the air jet to deflect the product. Line 351 carries command signals corresponding to the long products to driver unit 500 to control the energization of solenoid 511 which controls an air jet for deflecting the long products. The operation of driver unit 500 is the same as that of driver unit 400.

While I have shown a preferred embodiment of the invention, it will be understood that the invention is capable of variation and modification from the form shown so that the scope thereof should be limited only by the proper scope of the claims appended hereto.

What I claim is:

1. In apparatus for sorting products according to their lengths, the combination comprising means moving the product to be sorted through a zone having scanning means, said scanning means comprising a light-sensitive device connected to a circuit transmitting an electric signal while the product is in said scanning zone, said signal controlling an auxiliary signal comprising a number of pulses, said number being determined by the length of said electric signal which corresponds to the time interval that the product is in said scanning zone, means counting said pulses, switch means settable to predetermined numbers corresponding to different product lengths, comparator network means comparing the output of said counting means with the setting of said switch means, means responsive to the output of said comparator network producing control signals characterized by different product lengths, means connected to said last mentioned means for controlling separating means which separates the products scanned according to their lengths.

2. In apparatus for sorting products according to their lengths, the combination as set forth in claim 1 further characterized in that said means responsive to the output of said comparator network comprises a logic unit having a plurality of gates and means producing a strobe signal connected to said gates, said last mentioned means being actuated by said electric signal.

3. In apparatus for sorting products according to their lengths, the combination as set forth in claim 2 further characterized in that said comparator network output comprises a pair of plural input NAND gates and a pair of gates including flip-flops connected between said NAND gates and said logic unit, and means actuated by said electric signal providing a rest signal to said flip-flops.

4. In apparatus for sorting products according to their lengths, the combination as set forth in claim 3 further characterized in that said means providing said reset signal also provides a reset signal to said counting means.

5. In apparatus for sorting products according to their lengths, the combination as set forth in claim 2 further comprising means interrupting said strobe signal to said logic unit if said electric signal is not of at least a predetermined time duration.

6. In apparatus for sorting products according to their lengths, the combination as set forth in claim 5 further characterized in that said strobe signal interrupting means comprises means producing a pulse having said predetermined time duration and a gate responsive thereto.

7. In apparatus for sorting products according to their lengths, the combination as set forth in claim 1 further comprising an operating signal device controlled by said electric signal to indicate failure of said circuit transmitting said electric signal.

8. In apparatus for sorting products according to their lengths, the combination as set forth in claim 7 further characterized in that said operating signal device also comprises a time delay circuit having a time constant exceeding the longest time of said electric signal to detect said electric signal of excessive time duration, said time delay circuit controlling the bias to a transistor which controls an alarm when such excessive time duration signal is detected.

9. In apparauts for sorting products according to their lengths, the combination as set forth in claim 1 further characterized in that the output of said counting means and said comparator network means are binary coded and said switch means is provided with output terminals which are binary coded, said switch means being provided with thumb wheels with decimal calibrations indicating selected product lengths.

10. In apparatus for sorting products according to their lengths, the combination as set forth in claim 1 further characterized in that said means controlling said separating means comprises at least two driver units driving said separating means, and each of said driver units comprises two timing circuits connected in cascade, the first of said timing circuits delaying the energization of said separating means by a length of time required for a product to travel from said scanning means to said separating means and the second of said timing circuits controlling the duration of energization of said separating means.

11. In apparatus for sorting products according to their lengths, the combination as set forth in claim 10 further characterized in that said two timing circuits are each provided with variable controls so that the timing thereof may be varied.

References Cited

UNITED STATES PATENTS

| | | |
|---|---|---|
| 2,941,086 | 6/1960 | Gottschall et al. |
| 3,066,226 | 11/1962 | Lindstrom. |
| 3,159,749 | 12/1964 | Dalrymple et al. |
| 3,364,358 | 1/1968 | Ashworth _____ 356—167 |
| 3,455,444 | 7/1969 | Simmons _____ 209—82 |

ALLEN N. KNOWLES, Primary Examiner

U.S. Cl. X.R.

209—111.7; 250—223